June 30, 1925.
E. BELOT
1,543,976
CONTINUOUS MACHINE FOR THE IRONING OF TOBACCO LEAVES
AND FOR FLATTENING THE RIBS OF THE SAME
Filed Dec. 27, 1923    2 Sheets-Sheet 1
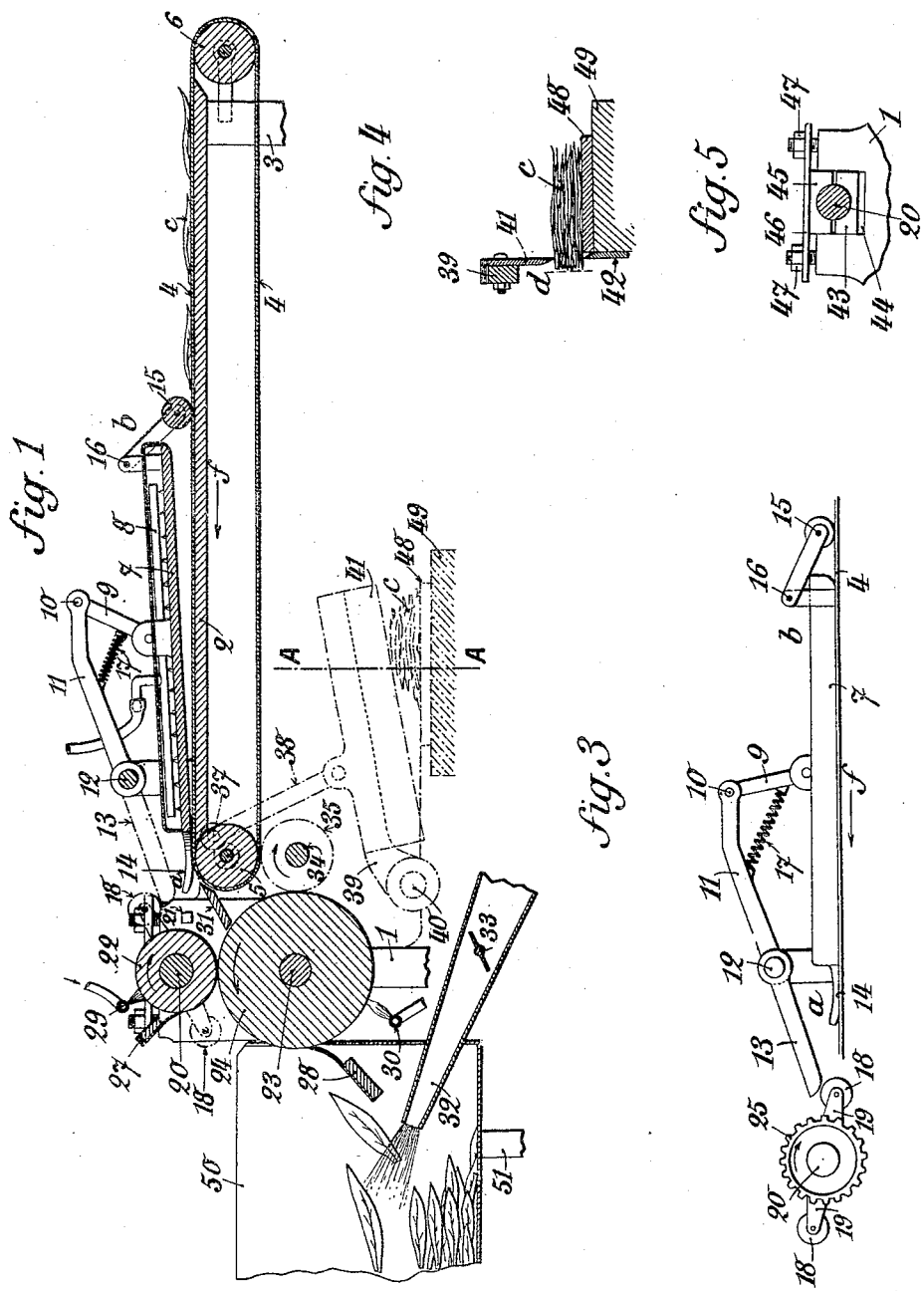
Inventor
EMILE BELOT

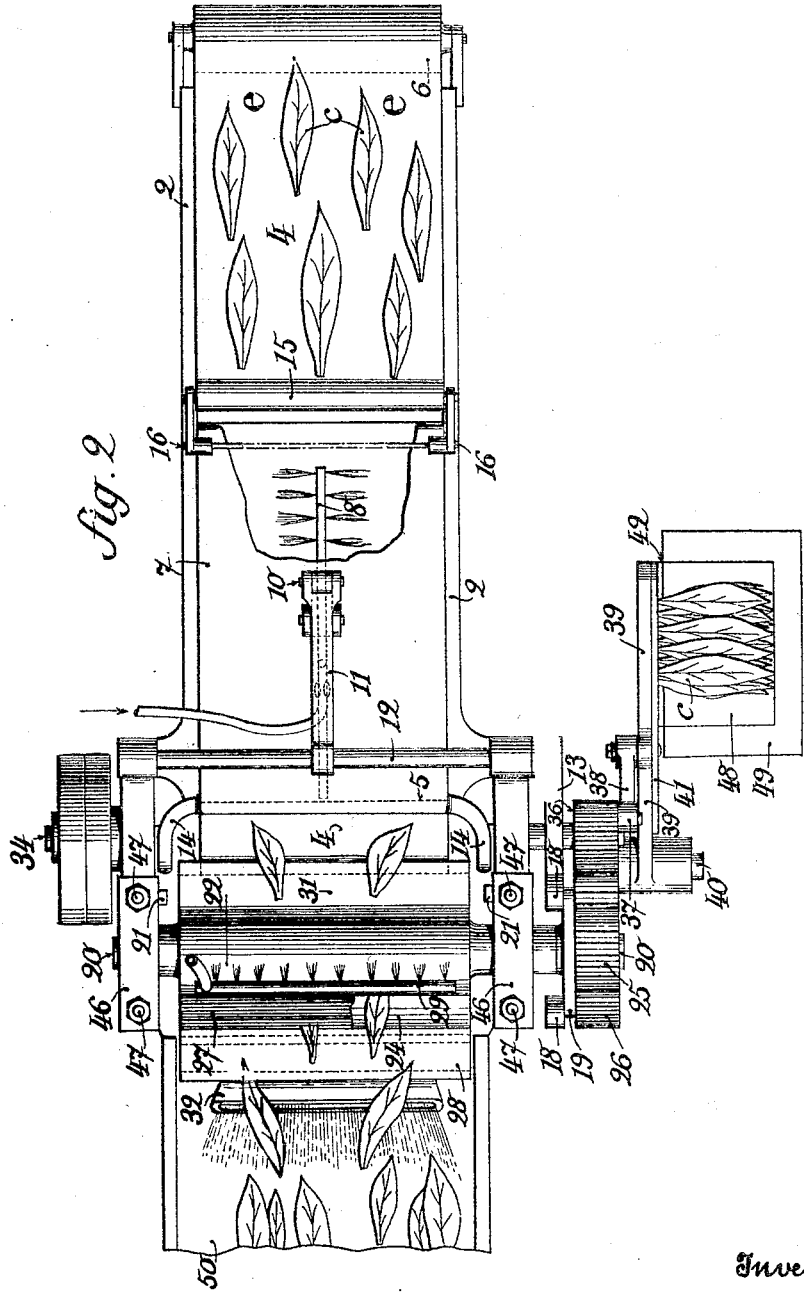

Patented June 30, 1925.

1,543,976

UNITED STATES PATENT OFFICE.

EMILE BELOT, OF PARIS, FRANCE.

CONTINUOUS MACHINE FOR THE IRONING OF TOBACCO LEAVES AND FOR FLATTENING THE RIBS OF THE SAME.

Application filed December 27, 1923. Serial No. 683,043.

*To all whom it may concern:*

Be it known that I, EMILE BELOT, a citizen of the Republic of France, and residing at Paris, Seine Department, No. 319 Rue de Charenton, in the Republic of France, have invented certain new and useful Improvements in Continuous Machines for the Ironing of Tobacco Leaves and for Flattening the Ribs of the Same, of which the following is a specification.

In the known methods of manufacture of cigars from long-leaf tobacco, the leaves must be moistened to the proper degree in order that the edges may be trimmed off, and when this latter operation has been performed the leaves thus moistened must be again dried. The side portions of the leaf which are thus removed are a source of loss in the manufacture.

If however it were simply desired to open the damp leaves, these could be moistened to a much less degree than is required for trimming off the edges, and if the edges of the leaves were flattened out, these parts could also form part of the cigar filler, provided the wide and thick peduncles were removed.

In the present invention, which relates chiefly to the preparation of leaves intended for use as cigar filler, the leaves are moistened just sufficiently to allow them to be fully opened by hand, and the leaves are then heated to a rather high temperature, for instance to 100° C. in order to soften the edges, and when opened out and in the heated state they are subjected to pressure in a calender which serves to flatten the ribs. Before heating and pressing the leaves, the peduncle is to be removed should this be found necessary.

To obviate any appreciable loss of the aroma, it is preferable to shorten the heating and flattening operations as far as possible, and also to rapidly cool the leaves which come out of the calender in the flattened state.

I provide for these conditions by the use of the machine which is described hereunder by way of example, and it comprises in combination a conveying device for the preliminarily moistened and opened leaves, a hot-pressing element analogous to a smoothing iron which is disposed above the said conveyor, a calender operating upon the heated leaves, and an air fan for suitably cooling and drying the leaves when issuing from the calender.

With the said machine, and due to the fact that the leaves are only slightly moistened, only a fraction of a minute will be required to perform the operations of heating, flattening and drying of the leaves, and this will offer advantages of a very important nature, and in particular, the loss of the aroma of the tobacco, far from being increased by the heat, is found to be much less than in the cold treatment wherein the leaves are strongly moistened, and now becomes a negligible factor. I further obviate the repeated handling of the leaves and also the necessity of providing rooms of great size and bulky apparatus for drying the leaves after flattening. As the said machine operates in a continuous manner, the output will be considerable and my said process is a source of a great saving of hand labour.

The appended drawings of a diagrammatic nature which are given by way of example illustrate a constructional form of my said machine.

Fig. 1 is an elevational view, with certain parts in section.

Fig. 2 is a plan view.

Fig. 3 is an elevational view of the ironing element in a position differing from that of Fig. 1.

Fig. 4 is a partial vertical section on the line A—A of Fig. 1.

Fig. 5 shows a detail of a bearing of the calender.

The said machine comprises a main frame, 1, 2, 3 whereof the parts 1 and 3 form supporting feet for the mechanism and the part 2 a table having movable thereon an endless canvas belt 4 driven by the drum 5 and stretched at the rear by the drum 6. Above the front part of the belt 4 is disposed the flat iron 7 which is heated by gas burners 8 or by electricity, steam or like means, and is controlled by a link 9 pivoted at 10 to an arm 11 mounted on the shaft 12 and driven by the lever 13.

Upon the ascent of the axle 10, the flat iron which is heaviest at the end *a* will rise at the end *b* and will bear at the end *a* by means of the lugs 14 upon the table 2. But if the said axle should descend sufficiently to enable the iron to bear upon the canvas belt 4 throughout its whole length, the latter will draw the iron in the direction of the arrow $f$.

During the descent of the iron upon the said belt, a roller 15 pivoted to an axle 16 disposed at the end $b$ of the iron will become separated from the said iron while still remaining in contact with the belt (Fig. 3). A spiral spring 17 facilitates the forward movement of the iron in the direction of travel of the canvas belt. The swinging movement of the lever 11, 13 is effected by a pair of diametrically opposite rollers 18 mounted upon arms 19 secured to a shaft 20 which is in continuous rotation. The adjustable stop-pieces 21 limit the horizontal motion of the lugs 14 and hence of the iron 7. A calender drum of hard metal 22 is mounted on the shaft 20, coacting with a like drum 24 mounted below it on the shaft 23; said drums rotate at the same peripheric speed but in the inverse direction, the drum shafts being coupled together by means of the gear wheels 25, 26 having the same diameter as the drums.

In friction contact with said drums are mounted the scrapers 27, 28 made of thin steel and either stationary or having a reciprocating motion parallel to the axis of the drums. The latter are provided with heating means, such as the gas burners 29, 30. Between the belt control drum 5 and the calender drum 24 is disposed an inclined metallic bridge 31. The flat outlet 32 of an air fan, not shown, is disposed below the scraper 28, and the blast can be regulated by the register 33.

The machine as a whole is driven by the shaft 34 having thereon the gear wheel 35 driving the drums 5, 24 by means of the respective gear wheels 26, 36. Upon the shaft of the drum 5 is an eccentric stud 37 coacting with a link 38 which imparts a reciprocating motion to the knife-holder 39 pivoted on a fixed axle 40. The knife 41 mounted upon the knife-holder 39 co-operates with a stationary knife 42.

The adjustment of the upper drum 22 must be very exact in order to prevent all crushing of the parenchyma of the leaves while at the same time providing for the flattening of their edges and allowing a slight ascent of the said drum whereby accidents to the mechanism will be obviated; to this end the two bearings of the shaft 20 are constructed as follows (Fig. 5). Each lower bearing element 43 is disposed upon a block 44 which is so adjusted as to allow between the calender drums a space of 0.2 to 0.5 mm. according to the character of the tobacco under treatment. Each upper bearing element 45 is secured to a steel strip 46 which can be more or less pressed down by the nuts 47 mounted upon stud-bolts secured to the machine frame 1. According to the degree of tightening of the bearings at the ends of the shaft 20, one end of the drum 22 can be made to entirely flatten the corresponding edges of the leaf, while the other end of the drum will hardly flatten the edges upon that side, and in this manner the parenchyma of the leaves near the point can be treated with care, provided the leaves are placed in a suitable direction upon the conveyor belt.

The operation of the said machine is as follows.

The leaves $c$ which are opened by hand and are piled upon one another in such manner that the peduncles are situated in the vertical plane $d$, Fig. 4, are disposed upon a movable plate 48 mounted upon a table 49. The knife 41 removes all the peduncles from the pile of leaves, for a length which is regulated by the position of the plate 48. The leaves thus freed from the thickest ligneous portion are placed lengthwise at $e$ upon the canvas belt conveyor 4 which brings them in the first place under the roller 15; the leaves pass thence under the iron 7 which is brought down upon them in order to heat and to iron them flat. When moving towards the rear, in the contrary direction to the arrow $f$, the said iron will rise and thus prevent any back motion of the leaves, which latter will continue to move forward to the bridge 31, passing over the same and being then seized and calendered by the drums 22, 24 which flatten the ribs of the leaves. Upon issuing from the said drums, the leaves are detached by the scrapers 27, 28 and drop into a box 50 into which they are drawn by the air blast from the nozzle 32. The current of air effects the cooling and also completes the drying of the leaves. The box 50 may be vertically movable, being disposed on the plate of a balance which is adjusted by a supporting rod 51 in such manner that the plate will descend as the leaves continue to fill up the box. It is not necessary to stop the machine in order to remove the leaves from the said box, since the latter is open at the end and has no vertical wall parallel to the axis of the calender drums.

According to the nature of the tobacco leaves and the size of their lateral portions, the machine can be operated by heating either the iron or the calender device alone, or by heating both of these elements at the same time. The iron as well as the calender drums are provided with insulation, not shown.

Claims:

1. In an apparatus for the ironing of tobacco leaves and for flattening the ribs of the same, the combination of means for heating the said leaves which have been previously slightly moistened, means for flattening the same and means for rapidly cooling them when leaving the said flattening means.

2. In an apparatus for the ironing of tobacco leaves and for flattening the ribs of the same, the combination of a continuously operated conveyor, a pressing and heating element disposed above the said conveyor, a continuously rotating calender adapted to receive the leaves issuing from the said conveyor, and an air fan for cooling the leaves when discharged from the said calender.

3. In an apparatus for the ironing of tobacco leaves and for flattening the ribs of the same, the combination of a continuously operated conveyor, a pressing and heating element disposed above the said conveyor, a continuously rotating calender adapted to receive the leaves issuing from the said conveyor, and an air fan for cooling the leaves when discharged from the said calender, the said pressing and heating element constituting a flat iron having a reciprocating motion upon the said continuously operated conveyor.

4. In an apparatus for the ironing of tobacco leaves and for flattening the ribs of the same, the combination of a continuously operated conveyor, a pressing and heating element disposed above the said conveyor, a continuously rotating calendar adapted to receive the leaves issuing from the said conveyor, and an air fan for cooling the leaves when discharged from the said calender, and a pivoted lever from which the said pressing and heating element is suspended by links, the said lever controlling the said pressing and heating element.

5. In an apparatus for the ironing of tobacco leaves and for flattening the ribs of the same, the combination of a continuously operated conveyor, a pressing and heating element disposed above the said conveyor, a continuously rotated calender adapted to receive the leaves issuing from the said conveyor, and an air fan for cooling the leaves when discharged from the said calender, links pivoted to the front part of the said pressing and heating element, and a roller revoluble upon the said links and in permanent contact with the said conveyor.

6. In an apparatus for the ironing of tobacco leaves and for flattening the ribs of the same, the combination of a continuously operated conveyor, a pressing and heating element disposed above the said conveyor, a continuously rotating calender adapted to receive the leaves issuing from the said conveyor, and an air fan for cooling the leaves when discharged from the said calender, means for adjusting the pressure of said calender, said means consisting of a block having thereupon the lower half of a bearing element for the calender shaft, a corresponding upper half of a bearing element, a steel strip having the latter element secured thereto, and means for imparting a greater or less pressure to the said steel strip.

In testimony that I claim the foregoing as my invention, I have signed my name in presence of a subscribing witness.

EMILE BELOT.

Witness:
 MAURICE ROUX.